(12) United States Patent
Goodman et al.

(10) Patent No.: US 8,060,261 B2
(45) Date of Patent: Nov. 15, 2011

(54) METHOD AND SYSTEM OF DETERMINING EFFECTIVENESS OF AN AIRCRAFT BRAKING SYSTEM ON AN AIRCRAFT DURING AN AIRCRAFT LANDING

(75) Inventors: William L. Goodman, Coupeville, WA (US); Thomas Imrich, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 847 days.

(21) Appl. No.: 12/124,519

(22) Filed: May 21, 2008

(65) Prior Publication Data

US 2009/0292433 A1     Nov. 26, 2009

(51) Int. Cl.
*G06F 19/00* (2006.01)

(52) U.S. Cl. ............................... 701/16; 701/10; 701/14

(58) Field of Classification Search .................. 701/3–5, 701/7–9, 15, 16, 18, 70, 71, 93, 96, 83, 78; 340/945, 947, 958, 972; 244/111, 183
See application file for complete search history.

(56) References Cited

U.S. PATENT DOCUMENTS

| 5,968,106 | A | 10/1999 | DeVlieg et al. | |
| 6,991,303 | B2 | 1/2006 | Woll | |
| 7,128,376 | B2* | 10/2006 | Williams et al. | 303/15 |
| 7,139,645 | B2* | 11/2006 | Villaume et al. | 701/16 |
| 7,586,422 | B2* | 9/2009 | Goodman et al. | 340/945 |
| 7,626,513 | B2* | 12/2009 | Goodman et al. | 340/945 |

FOREIGN PATENT DOCUMENTS

EP      1349779      10/2003

OTHER PUBLICATIONS

U.S. Appl. No. 11/461,880, filed Aug. 2, 2006, Goodman, et al.
U.S. Appl. No. 11/464,642, filed Aug. 15, 2006, Goodman, et al.

* cited by examiner

*Primary Examiner* — Richard M. Camby
(74) *Attorney, Agent, or Firm* — Tung & Associates (57) ABSTRACT

A method of determining effectiveness of an aircraft braking system on an aircraft during an aircraft landing including generating a scalar deceleration value when a predefined braking event occurs that corresponds to effectiveness of a braking system associated with an aircraft landing operation during occurrence of a predefined braking event on an aircraft; and disseminating the generated scalar deceleration value to downstream users. A system includes a data collection module adapted to collect data relating to braking data associated with each of an associated plurality of segments of deceleration of the aircraft during a predefined braking event; a calculation module adapted to generate a scalar deceleration value based on data obtained; and a communication module in signal communication with the calculation module and with at least one downstream user of the system adapted to communicate the scalar deceleration value to at least one downstream user.

20 Claims, 4 Drawing Sheets

| ≥ .75 ASSIGN SEGMENT GRAPHIC COLOR "GREEN" | 0 |
| --- | --- |
| ≥ .50 AND < .75 ASSIGN SEGMENT GRAPHIC COLOR "YELLOW" | 1 |
| ≥ .25 AND < .50 ASSIGN SEGMENT GRAPHIC COLOR "ORANGE" | 2 |
| ≥ 0 AND < .25 ASSIGN SEGMENT GRAPHIC COLOR "RED" | 3 |
| "ANTISKID" ACTIVATED - SEGMENT GRAPHIC COLOR "MAGENTA" | 4 |

METHOD AND SYSTEM OF DETERMINING EFFECTIVENESS OF AN AIRCRAFT BRAKING SYSTEM ON AN AIRCRAFT DURING AN AIRCRAFT LANDING

FIELD OF THE INVENTION

The present invention generally relates to a method and associated system that determines the effectiveness of aircraft braking on contaminated runways experienced by landing aircraft.

BACKGROUND

Current methods of providing runway braking action reports may include large discrepancies from the braking action encountered by actual landing aircraft. In part, these discrepancies may be due to the differing systems and methods of measurement and observation currently in use for determining runway conditions. Runway conditions may be affected by the presence of contaminants such as water, snow, or ice.

Presently, pilots of landing aircraft may make runway observations and relay the observations to other interested parties. The inaccuracies of pilot observations result from pilots inadvertent distribution of subjective data. A pilot having a great deal of experience in landing upon contaminated runways may judge the conditions of a given contaminated runway to be of a lower risk to a landing aircraft than would a pilot unaccustomed to landing an aircraft upon a contaminated runway.

Other systems presently exist for determining runway conditions such as friction testers and Mu meters. These systems may provide some indication of conditions, but oftentimes are used in conjunction with ground-based vehicles. The presence of a ground-based vehicle upon a runway means that the runway must be closed from aircraft traffic.

A further shortfall of ground-based systems is that these systems are generally incapable of replicating the conditions encountered by an aircraft. In particular, ground based systems may not be capable of achieving the high speed of a landing aircraft. Additionally, due to discrepancies in weight and other factors, ground-based systems may not hydroplane upon a contaminated runway, whereas a landing aircraft may.

Ground-based systems may only have the capability to test a localized area of a runway, as is the case with a fixed-position, ground-based system. Mobile ground-based systems may have the capability of testing multiple runways, or portions thereof, but may provide stale data, as the runway cannot be constantly assessed by a mobile ground-based system.

While existing devices suit their intended purposes, what is needed is a method and system of generating and disseminating a digital deceleration value (DDV) by landing aircraft.

SUMMARY

A method of determining the effectiveness of aircraft braking for distribution to interested parties that is generated by a landing aircraft. Such a determination should include the generation of a scalar deceleration value that corresponds to the effectiveness of aircraft braking associated with the landing aircraft. This deceleration value would be disseminated to downstream users. A system is also provided, including a data collection module adapted to collect data relating to braking data associated with each of an associated plurality of segments of deceleration of the aircraft during a braking event; a calculation module adapted to generate a scalar deceleration value and optionally, a corresponding Landing Performance Graphic (LPG) based on data obtained; and a communication module in signal communication with the calculation module and with at least one downstream user of the system adapted to communicate the scalar deceleration value to at least one downstream user.

BRIEF DESCRIPTION OF THE DRAWINGS

These and other objects, features and advantages of the present invention will become apparent from the following detailed description and the appended drawings in which.

DETAILED DESCRIPTION

A system and method are provided to determine a Digital Deceleration Value (DDV) or plurality of Segment Digital Deceleration Values (SDDV) and disseminate either one of the DDV or SDDV to downstream users. Each of the DDV and SDDV is a scalar number representing the relative effectiveness of the braking system of an aircraft upon a particular segment of the runway. The scalar Digital Deceleration Value (DDV) and Segment Digital Deceleration Values (SDDV) created by the system and method included herein provide pilots, air traffic controllers, airports, and other downstream users with valuable real-time information as to the conditions upon a given runway.

The presence of contaminants upon a runway may introduce hazardous conditions for landing aircraft, as the effectiveness of wheel brakes may be reduced or negated by a low coefficient of friction between the runway surface and the wheels of landing aircraft.

Therefore, it is advantageous for the pilots of landing aircraft, as well as others, to know in advance of landing, the runway conditions, and hence the braking effectiveness of aircraft, upon a given runway.

As disclosed herein, the DDV and SDDV are used to apprise users of the associated system and method of the conditions upon runways. However, it is also contemplated that the DDV and SDDV, as well as the associated system and method may be used upon surfaces other than runways, and by vehicles other than aircraft.

As disclosed herein for non-limiting illustrative purposes, the DDV and SDDV, as well as associated system and method operate to optimize the knowledge of aircraft pilots and others with regards to landing conditions upon a runway, thereby allowing for enhanced decision-making by users of the system and method. The DDV and SDDV provide a measure of the actual aircraft deceleration performance and provides a guide for the landing runway braking conditions.

The system and method may be used by any entity benefiting from knowledge of runway conditions. A "user" or "downstream user" of the DDV and SDDV, as well as of the associated system and method may include, but is not limited to: pilot, air traffic controller, airport personnel, military personnel, or any other person or entity that may desire to know the braking conditions encountered by a landing aircraft upon a runway.

Referring now to the drawings, a system and method are provided to determine a Digital Deceleration Value (DDV) or plurality of Segment Digital Deceleration Values (SDDV) and disseminate either one of the DDV or SDDVs to downstream users.

Figure 1:
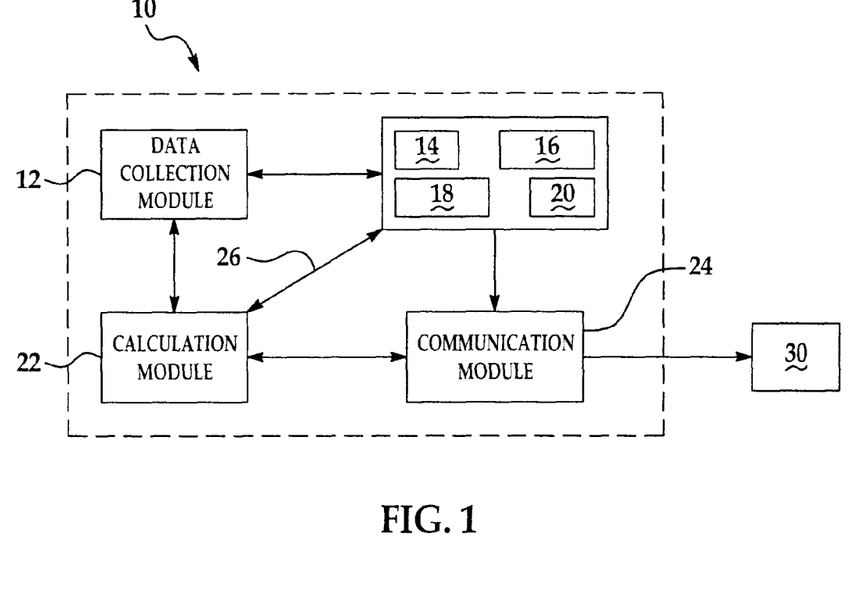
FIG. 1 illustrates a system for generating and disseminating either a single Digital Deceleration Value (DDV) or a plurality of segment DDVs and optionally, an associated LPG by a landing aircraft in accordance with an embodiment of the invention.

As illustrated in FIG. 1, the system 10 includes a data collection module 12, the data collection module 12 adapted to collect data relating to braking data associated with each of an associated plurality of segments of deceleration of the aircraft during a predefined braking event from each of a plurality of sensors 14, a Global Positioning System (GPS) 16, an aircraft braking system 18, and an aircraft control system 20; a calculation module 22, the calculation module 22 in signal communication with the data collection module 12 and adapted to generate a scalar deceleration value based on data obtained from the data collection module 12 when a predefined braking event occurs that corresponds to effectiveness of a braking system associated with an aircraft landing operation during occurrence of a predefined braking event on an aircraft; and a communication module 24, the communication module 24 in signal communication with the calculation module 22 and with at least one downstream user of the system 10 adapted to communicate the scalar deceleration value calculated by the calculation module 22 to at least one downstream user of the system.

As used herein, the term "module" or "modules" is defined as one or more units capable of processing or evaluating signals input into or stored within system 10 for obtaining a SDDV and a DDV. Each module may be a stand-alone unit or a plurality of units comprising hardware or software or a combination thereof.

In the embodiment of the invention illustrated in FIG. 1, the data collection module 12 is in electrical and signal communication with each of a plurality of sensors 14. The plurality of sensors 14 may include, but are not limited to: air speed sensors, ground speed sensors, braking force sensors, and wheel speed sensors. Each respective sensor of the plurality of sensors 14 may also be in electrical and signal communication with each of the other respective sensors of the plurality of sensors 14.

In one embodiment of the invention, the Global Positioning System (GPS) 16 may be a system included in an aircraft that determines each of the aircraft's associated speed, location, and elevation by satellite triangulation, as is commonly known in the art. The GPS 16 may include a display and may be placed in electrical and signal communication with the data collection module 12.

In one embodiment of the invention, the aircraft braking system 18 may include any components or controls associated with an aircraft that are used to brake the aircraft when the aircraft is upon a ground surface. Examples of aircraft braking system components include, but are not limited to: brake pads, brake shoes, brake rotors, brake drums, hydraulic cylinders and pumps, hydraulic lines, and electronic or computerized brake controllers. The aircraft braking system 18 may be in electronic and signal communication with the data collection module 12, each respective sensor of the plurality of sensors 14, the aircraft control system 20, the GPS 16, and the calculation module 22.

In one embodiment of the invention, the aircraft control system 20 may include any components or controllers associated with an aircraft that operate to control any aspect of the function of the aircraft with which the components or controllers are associated. Examples of aircraft control system components or controllers may include, but are not limited to: automatic stability controls, automatic pilot, automated or computer-assisted landing controls, and automated anti-skid controllers.

In one embodiment of the invention, the aircraft control system 20 may also include at least one display module.

In one embodiment of the invention, the data collection module 12 may also be in electrical and signal communication with each of the calculation module 22 and the communication module 24.

In one embodiment of the invention, the calculation module 22 is in electrical and signal communication with the data collection module 12, the plurality of sensors 14, the GPS 16, the aircraft braking system 18, the aircraft control system 20, and the communication module 24.

In an embodiment of the invention, the calculation module 22 is adapted to execute calculations using data provided by the data collection module 12 and to provide data corresponding to DDV values to the communication module 24.

In one embodiment of the invention, the calculation module 22 calculates a plurality of values including a plurality of actual segment deceleration values (ASD) determined from the collected braking data for each of an associated plurality of segments of deceleration of the aircraft during a predefined braking event, and a plurality of forecast segment deceleration values (FSD) for each of the associated plurality of segments of deceleration of the aircraft and compares each of the ASD with each of the FSD to generate the at least one scalar deceleration value when a predefined braking event occurs that corresponds to effectiveness of a braking system associated with an aircraft landing operation during occurrence of a predefined braking event on an aircraft.

In another embodiment of the invention, the calculation module 22 may be adapted to receive a signal 26 from the aircraft control system 20 indicating that the automated anti-skid function of the aircraft has been activated by the aircraft control system 20.

In another embodiment of the invention, the calculation module 22 may be adapted to determine the SDDV for each segment of deceleration.

Figure 2:
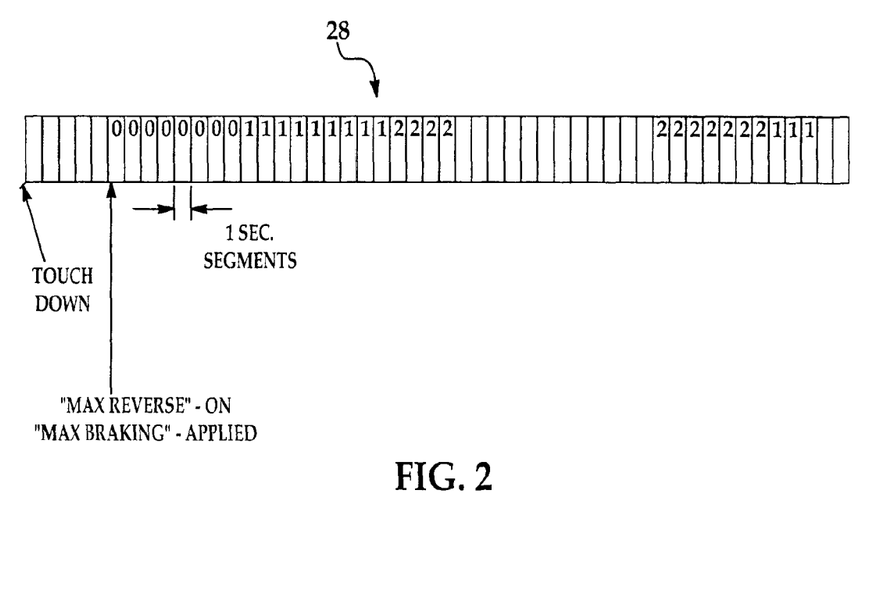
FIG. 2 illustrates a Landing Performance Graphic including indicia and a plurality of colors corresponding to differing Segment Digital Deceleration Values in accordance with an embodiment of the invention.

In another embodiment of the invention, the calculation module 22 may be adapted to form a Landing Performance Graphic 28, the Landing Performance Graphic 28 adapted to be displayed upon the at least one display associated with the aircraft control system 20. The Landing Performance Graphic 28 may also be displayed upon displays of other users of the system 10, those users having associated displays. An exemplary Landing Performance Graphic is illustrated in FIG. 2.

In one embodiment of the invention, the communication module 24 may be in electrical and signal communication with the calculation module 22. The communication module 24 may be adapted to disseminate the DDV by providing an output signal 30 corresponding to a DDV to other users of the method and system 10 disclosed herein.

In an embodiment of the invention, the communication module 24 may be adapted to disseminate the DDV by wirelessly broadcasting a signal corresponding to the DDV at a predefined broadcast frequency, such that any receiver capable of receiving signals at the broadcast frequency may receive the broadcast.

In another embodiment of the invention, the communication module 24 may be adapted to disseminate each of the SDDV values by providing a signal corresponding to each of the SDDV values.

In another embodiment of the invention, the communication module 24 may be adapted to disseminate the Landing Performance Graphic 28 by providing an output signal 30 corresponding to the Landing Performance Graphic 28.

Figure 3:
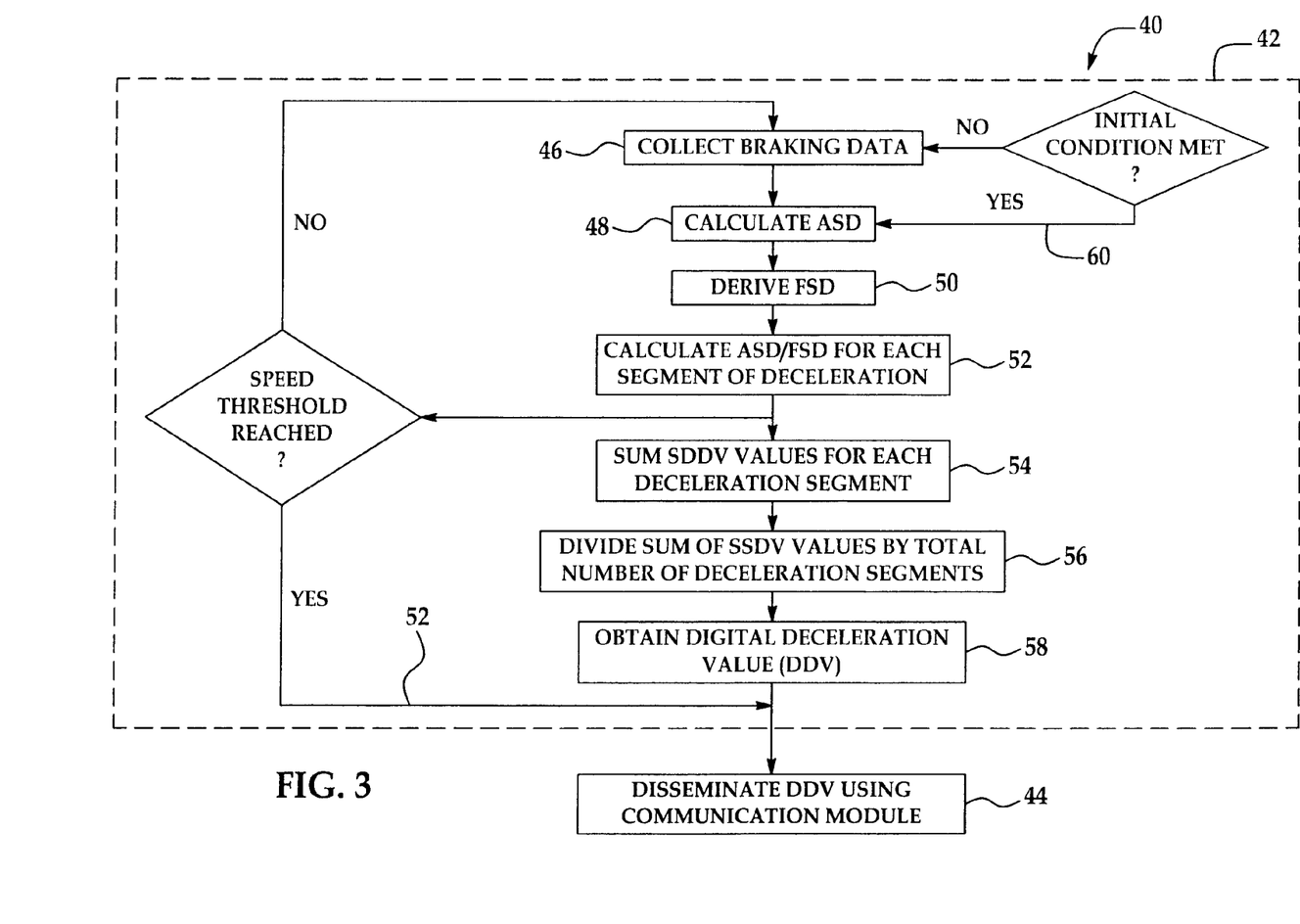
FIG. 3 illustrates a method of generating and disseminating a Digital Deceleration Value by a landing aircraft in accordance with an embodiment of the invention.

In one embodiment of the invention shown as a flowchart in FIG. 3, a method 40 performed by the system 10 of determining effectiveness of an aircraft braking system on an aircraft during an aircraft landing generally includes: generating a scalar deceleration value when a predefined braking event occurs that corresponds to effectiveness of a braking system associated with an aircraft landing operation during occurrence of a predefined braking event on an aircraft (42); and disseminating the generated scalar deceleration value to downstream users (44).

As illustrated in FIG. 3, the system 10 generally operates to: collect braking data from an aircraft that has landed on a ground surface (46); calculate an Actual Segment Deceleration (ASD) from the collected braking data for each of an associated plurality of segments of deceleration (48); derive a Forecast Segment Deceleration (FSD) for each of the plurality of associate segments of deceleration of the aircraft (50); compare the ASD with the FSD to determine the effectiveness of the aircraft braking system (52) for each time segment of deceleration; sum ASD/FSD of each of the time segments of deceleration (54); and divide the sum of the plurality of SDDV by a total number of SDDV (56) to obtain a Digital Deceleration Value (58).

Figure 5:
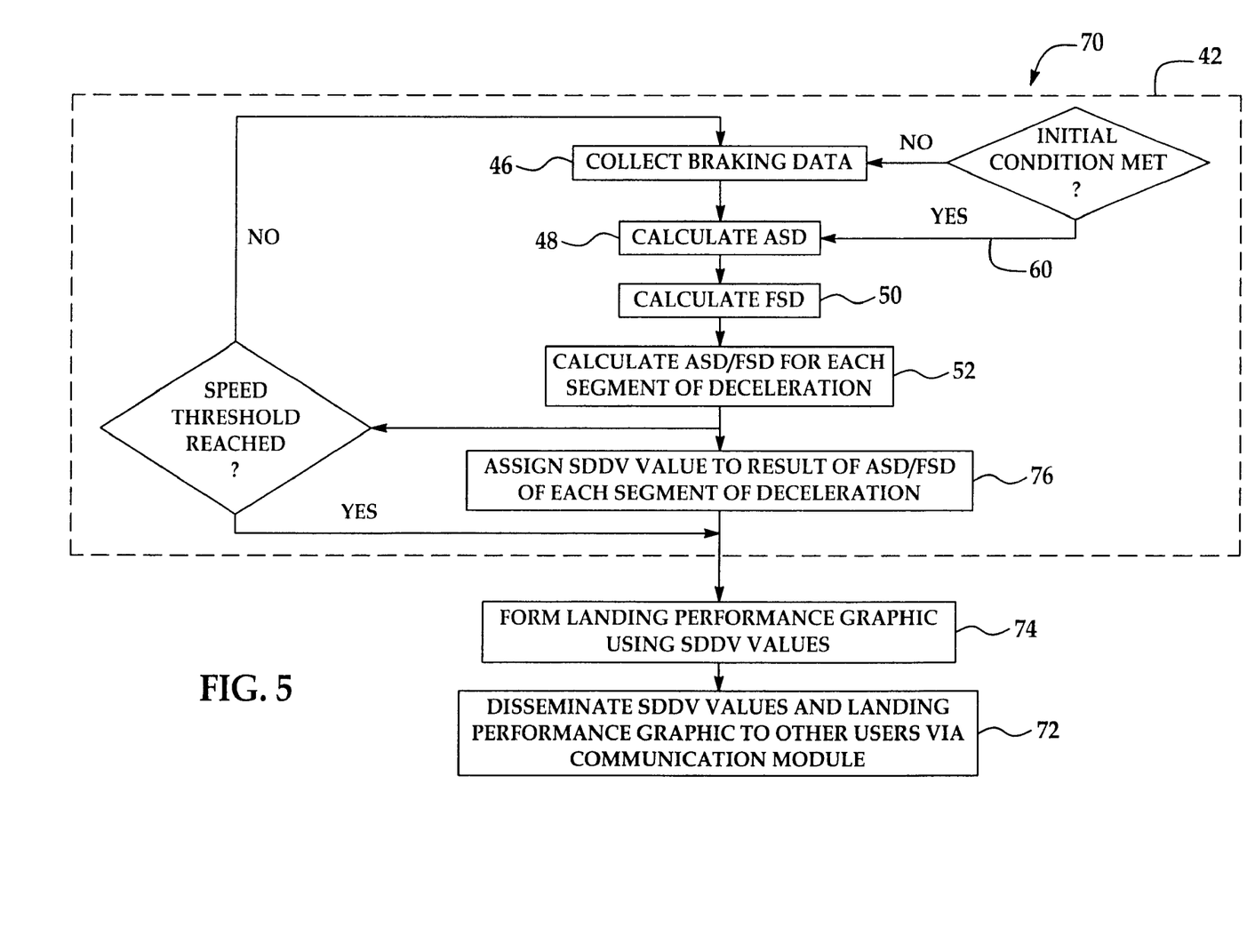
FIG. 5 illustrates a method of generating and disseminating a plurality of segment digital deceleration values by a landing aircraft in accordance with an embodiment of the invention.

In embodiments of the invention shown in FIGS. 3,5, respectively, braking data may be collected (48) from an aircraft that has landed by the data collection module 12. The braking data may be provided by the plurality of sensors 14. Once an initial braking condition is met (60), wherein the braking condition includes one or more of the following conditions: a predetermined time has elapsed after an initial braking event occurs, a predefined rollout distance is reached after an initial braking event occurs, or a predefined deceleration time segment or a predefined rollout distance has been reached upon application of either one of or both of a full reverse thrust event or a maximum braking event occurs.

If the initial condition has not been met, then braking data is collected (46) until an initial condition has been met (60). Once the initial condition has been met, then the ASD is calculated by the calculation module 22 (48).

In one embodiment of the invention, the calculation module 22 may determine the ASD (48). The ASD may correspond to the actual deceleration of the aircraft during an associated segment of deceleration of the aircraft based on actual ground surface parameters and aircraft parameters associated with the landing aircraft. The actual deceleration may be measured in terms of feet per second per second, meters per second per second, or any other desired units.

In one embodiment of the invention, the associated segment of deceleration of the aircraft may be correlated with a predefined amount of time that the aircraft decelerates on a ground surface wherein the ground surface may be any surface onto which the aircraft lands such as a conventional runway.

In one embodiment of the invention, the associated segment may be one second. In other embodiments of the invention, the associated segment used to determine the ASD may be less than one second.

In another embodiment of the invention, the associated segment used to determine the ASD may be greater than one second.

In another embodiment of the invention, the ASD may be determined by the calculation module 22 (48) according to an associated segment correlated with a predefined distance that the aircraft decelerates on the ground surface. This predefined distance may be referred to as a "rollout distance". A rollout distance is the linear distance traveled by an aircraft rolling upon the aircraft's associated wheels during braking.

In one embodiment of the invention, the predefined rollout distance may be used by the calculation to determine the ASD (48). The ASD may be provided in feet, meters, or any other desired unit.

In an embodiment of the invention, the predefined rollout distance is ten feet. In other embodiments of the invention, the predefined rollout distance used to define the ASD may be a distance less than or greater than ten feet, depending upon the number of samples desired by a user.

In one embodiment of the invention, the ASD of an aircraft is calculated by the calculation module 22 (48) using either a time segment of deceleration or rollout distance beginning with the application of full reverse thrust (MAX REVERSE) by at least one associated aircraft engine.

In another embodiment of the invention, the ASD of an aircraft is calculated by the calculation module 22 (48) using either of a time segment of deceleration or rollout distance, the calculation module 22 beginning the calculations at the time of full application of an aircraft's associated braking system (MAX BRAKING).

In another embodiment of the invention, the ASD is calculated by the calculation module 22 (48), the calculation module 22 using either a time segment of deceleration or rollout distance beginning with MAX REVERSE and MAX BRAKING to perform the required calculations.

In one embodiment of the invention, once the ASD is calculated by the calculation module 22, the Forecast Segment Deceleration (FSD) may be calculated by the calculation module 22 (50). The FSD may operate to provide a preliminary indication of deceleration expected of an aircraft landing upon a runway based on predicted ground surface parameters and predicted aircraft parameters including corrective factors associated with the landing aircraft.

Figure 4:
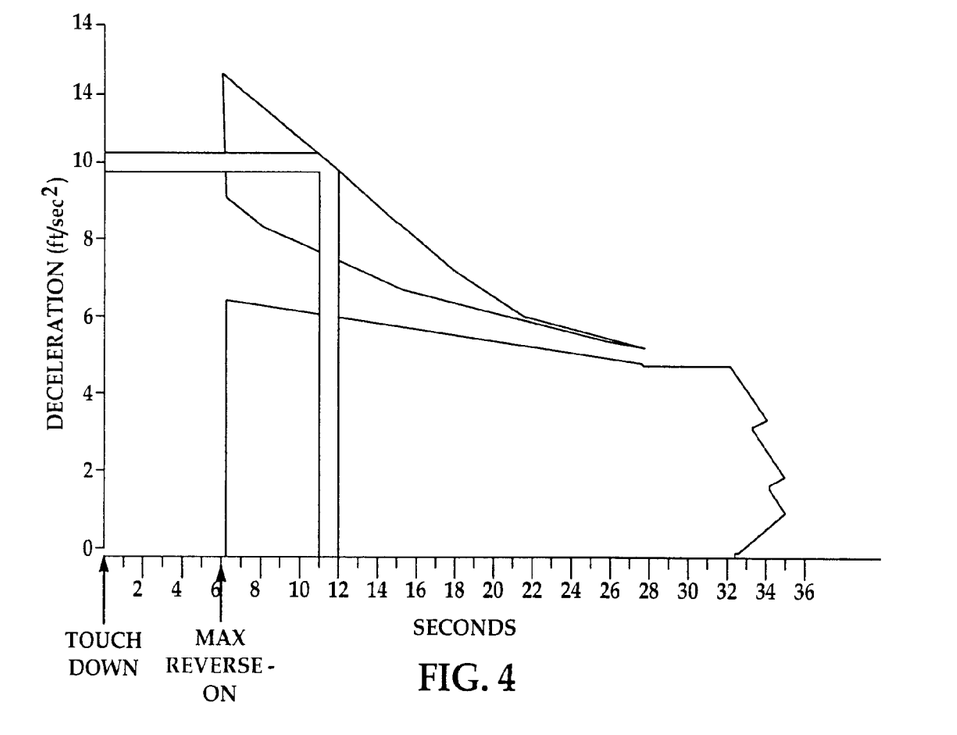
FIG. 4 illustrates a graph including a plot of the forecast deceleration of an aircraft versus time and includes the application of full reverse in accordance with an embodiment of the invention.

In an embodiment of the invention, the FSD is calculated by the calculation module 22, the calculation module 22 calculates the FSD using corrective factors and the known dry runway performance of the aircraft, the corrective factors include, but are not limited to: aircraft type, aircraft weight, aircraft configuration, aircraft landing speed, prevailing winds, tailwind or headwind speed, ambient air temperature, runway composition, runway condition, and presence of runway contaminants. A graph illustrating exemplary FSD values for an aircraft is illustrated in FIG. 4.

In one embodiment of the invention, the FSD may be calculated by the calculation module 22 (50) as the forecasted deceleration of the aircraft during a predefined time interval. The deceleration may be forecast in terms of feet per second per second, meters per second per second, or any other desired units.

In another embodiment of the invention, the predefined time interval used by the calculation module 22 to calculate the FSD may be one second.

In one embodiment of the invention, the time interval used to calculate the FSD may be less than one second, depending upon the number of segments desired by a user or the number of segments required to accurately reflect runway conditions.

In one embodiment of the invention, the time interval used to calculate the FSD may be greater than one second, depending upon the number of segments desired by a user or the number of segments required to accurately reflect runway conditions.

In another embodiment of the invention, the FSD may be calculated by the calculation module 22 (50), the calculation module 22 performing the calculation using a predefined "rollout distance", rather than a predefined time interval. As defined herein, "rollout distance" is the linear distance traveled by an aircraft while the aircraft is rolling upon the aircraft's associated wheels during braking.

In one embodiment of the invention, the predefined rollout distance defining each deceleration segment used by the calculation module 22 in calculating the FSD may be provided in feet, meters, or any other desired unit.

In an embodiment of the invention, the predefined rollout distance used by the calculation module 22 in calculating the FSD (50) is ten feet.

In another embodiment of the invention, the predefined rollout distance used in calculating the FSD (50) may be a distance less than ten feet, depending upon the number of segments desired by a user.

In another embodiment of the invention, the predefined rollout distance used in calculating the FSD (50) may be a distance greater than ten feet, depending upon the number of segments desired by a user.

In one embodiment of the invention, the FSD of an aircraft is calculated by the calculation module 22 (50) using either a time segment of deceleration or rollout distance beginning with the anticipated MAX REVERSE, as illustrated in FIG. 4.

In another embodiment of the invention, the FSD of an aircraft is calculated by the calculation module 22 (50) using either a time segment of deceleration or rollout distance beginning with anticipated MAX BRAKING.

In another embodiment of the invention, the FSD is forecast using either a time segment of deceleration or rollout distance segment beginning with the anticipated MAX REVERSE and the anticipated MAX BRAKING.

In the embodiment of the invention illustrated in FIG. 3, the calculation module 22 operates to divide ASD by FSD (ASD/FSD) for each of the plurality of associated segments of deceleration of the aircraft (52). In calculating the ASD/FSD, the calculation module 22 is operating to compare the Actual Segment Deceleration with the Forecast Segment Deceleration. Doing so provides an indication of the braking performance of the aircraft under actual conditions compared with ideal conditions.

In the embodiment of the invention illustrating a method 70 depicted in the flowchart shown in FIG. 5, the calculation module 22 operates to calculate ASD/FSD for a predefined time segment of deceleration (52). The calculation of ASD/FSD for a predefined time segment of deceleration by the calculation module 22 provides a segment value. The segment value may fall within a plurality of segment value ranges, the segment value ranges corresponding to a predefined SDDV. Thus, the calculation module 22 may assign SDDV values to the result of ASD/FSD of each associated segment of deceleration of the aircraft (76).

Figure 6:
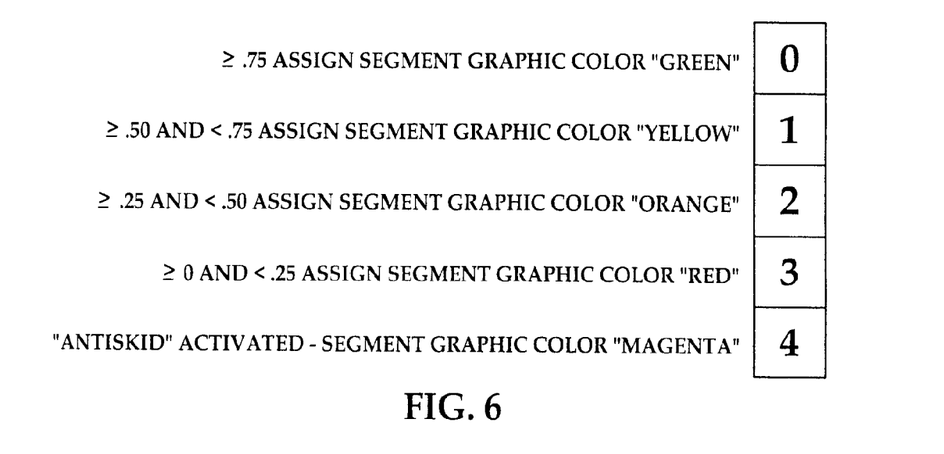
FIG. 6 illustrates a chart showing the assignment of Segment Digital Deceleration Values corresponding to the result of the Actual Segment Deceleration divided by the Forecast Segment Deceleration in accordance with an embodiment of the invention.

A representative scale SDDV is depicted in the deceleration segment chart shown in FIG. 6. As can be seen in FIG. 6, an elevated SDDV indicates reduced braking effectiveness, and is therefore indicative of potentially contaminated runway conditions associated with a given segment of deceleration of the aircraft.

In one embodiment of the invention, a first segment value range may include values for ASD/FSD in the range equal to or greater than 0.75. The first segment value range may correspond to a Segment Digital Deceleration Value (SDDV) of 0 as illustrated in FIG. 6 may be associated with a segment graph color of green.

In another embodiment of the invention, a second segment value range may include values for ASD/FSD in the range equal to or greater than 0.5 up to and equal to 0.75. The second segment value range may correspond to an SDDV of 1 as illustrated in FIG. 6 may be associated with a segment graph color of yellow. For example, an ASD/FSD of 0.6 for a given segment 1 may indicate that under current actual conditions, the braking system of the aircraft was sixty percent as effective as the braking system of the aircraft would have been under ideal conditions.

In another embodiment of the invention, a third segment value range may include values for ASD/FSD in the range equal to or greater than 0.25 up to and equal to 0.5. The third segment value range may correspond to an SDDV of 2 as illustrated in FIG. 6 may be associated with a segment graph color of orange.

In another embodiment of the invention, a fourth segment value range may include values for ASD/FSD in the range equal to or greater than 0 up to and equal to 0.25. The fourth segment value range may correspond to an SDDV of 3 as illustrated in FIG. 6 may be associated with a segment graph color of red.

In another embodiment of the invention shown in FIGS. 1 and 6, the calculation module 22 is in signal communication with the associated control system of the aircraft. The calculation module 22 receives a signal indicating the activation of the associated aircraft anti-skid functions and may provide an SDDV of 4 associated with a segment graphic color of magenta for any segment during which the anti-skid functions of the aircraft were activated.

In the embodiments of the invention illustrated in FIG. 3, upon the aircraft reaching a predefined speed threshold (62), the calculation module 22 operates to sum each of the SDDV values (54) calculated during the landing of the aircraft. The calculation module 22 may then operate to divide the summation of SDDV values by the total number of segments (56), thereby obtaining a DDV (58).

In one embodiment of the invention when the aircraft is at full stop, the predefined speed threshold may be zero.

In another embodiment of the invention, the predefined speed threshold may be the aircraft's desired taxi speed.

In another embodiment of the invention, the DDV may be disseminated to downstream users when a predefined threshold speed of the aircraft is reached (62). The DDV may be disseminated to other users by the communication module 24.

In an embodiment of the invention, the calculation module 22 may apply a corrective factor to the DDV or each of the SDDV values. The corrective factor may be correlated to a particular aircraft or airframe. The application of the corrective factor may allow for a more accurate DDV or SDDV, as a larger relatively large aircraft will generally take a longer distance to decelerate to full stop or taxi speed than a relatively smaller aircraft.

In one embodiment of the invention, each of the SDDV values may be disseminated to downstream users when a threshold speed of the aircraft is reached (72). In the method 70 illustrated in the flowchart depicted in FIG. 5, the SDDV values may be used to form a Landing Performance Graphic 28 (74) depicting runway conditions by mapping each of the SDDV to form the Landing Performance Graphic 28. The Landing Performance Graphic 28 operates to provide users with a graphical representation of conditions at particular points along a runway. Thus, if a particular point upon a runway may cause an aircraft to have reduced braking effectiveness, the pilot of that aircraft may be prepared for the reduced braking effectiveness by knowing the precise location of, and the exact effect upon braking effectiveness, of the particular point.

In an embodiment of the invention, the Landing Performance Graphic 28 may include a plurality of colors, wherein each respective color of the plurality of colors corresponds to a predefined SDDV.

In another embodiment of the invention, the Landing Performance Graphic 28 may include indicia of the SDDV for each segment of deceleration. The indicia may include, but is not limited to: numbers and symbols.

In one embodiment of the invention, the indicia may be displayed in conjunction with the plurality of colors described above, as illustrated in FIG. 2.

In another embodiment of the invention, the indicia may be displayed separately from the plurality of colors described above.

In one embodiment of the invention, the Landing Performance Graphic 28 may be displayed upon associated instrumentation of aircraft near the runway.

In another embodiment of the invention, the Landing Performance Graphic 28 may be displayed upon associated instrumentation of other downstream users including, but not limited: airport personnel associated with clearing runways and air traffic controllers.

In another embodiment of the invention, the Landing Performance Graphic 28 may be displayed upon associated instrumentation within the aircraft generating the data, thereby allowing members of the flight crew to track braking performance of the aircraft in real time.

From the foregoing, it should be appreciated that several embodiments of the method and system of generating and disseminating a digital deceleration value by a landing aircraft to determine effectiveness of an aircraft braking system for the landing aircraft have been provided.

While several aspects have been presented in the foregoing detailed description, it should be understood that a vast number of variations exist and these aspects are merely an example, and it is not intended to limit the scope, applicability or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

What is claimed is:

1. A method of determining effectiveness of an aircraft braking system on an aircraft during an aircraft landing comprising:
generating a scalar deceleration value when a predefined braking event occurs, the scalar deceleration value corresponds to effectiveness of a braking system associated with an aircraft landing operation during occurrence of the predefined braking event on an aircraft, the scalar deceleration value comprising an actual deceleration of said aircraft compared to a predicted deceleration of said aircraft during each of a plurality of time intervals or distance intervals comprising said braking event; and
disseminating the generated scalar deceleration value to downstream users, said downstream users located off the aircraft.

2. The method of claim 1, further comprising:
collecting braking data from the aircraft that has landed on a ground surface;
calculating an actual segment deceleration (ASD) from the collected braking data for each of an associated plurality of segments of deceleration of the aircraft during a predefined braking event;
calculating a forecast segment deceleration (FSD) for each of the plurality of associated segments of deceleration of the aircraft; and
comparing the ASD with the FSD to determine the effectiveness of the aircraft braking system.

3. The method of claim 2, wherein the ASD is a function of actual ground surface parameters and actual aircraft parameters associated with the landing aircraft.

4. The method of claim 2, wherein the FSD is a function of predicted ground surface parameters and predicted aircraft parameters associated with the landing aircraft.

5. The method of claim 2, wherein the ground surface is a runway.

6. The method of claim 2, wherein comparing the ASD with the FSD comprises:
dividing the ASD by the FSD for each associated segment of deceleration of the aircraft to determine a segment digital deceleration value (SDDV).

7. The method of claim 6, further comprising:
defining the SDDV as the scalar deceleration value.

8. The method of claim 2, wherein comparing the ASD with the FSD comprises:
dividing the ASD by the FSD for each of a plurality of associated segments of deceleration of the aircraft to calculate each of a plurality of segment digital deceleration values (SDDV).

9. The method of claim 8, further comprising:
summing the plurality of SDDV; and
dividing the sum of the plurality of SDDV by a total number of SDDV to obtain a digital deceleration value (DDV), wherein the DDV defines the scalar deceleration value.

10. The method of claim 9, further comprising:
disseminating the DDV to the downstream users when a threshold speed of the aircraft is reached.

11. The method of claim 8, further comprising:
mapping each of the calculated SDDV to form a landing performance graphic (LPG).

12. The method of claim 11, further comprising:
disseminating the plurality of SDDV and LPG to downstream users when a threshold speed of the aircraft is reached.

13. The method of claim 1, correlating each associated segment of deceleration of the aircraft with a predefined amount of time that the aircraft decelerates on a ground surface.

14. The method of claim 1, correlating each associated segment of deceleration of the aircraft with a predefined distance that the aircraft decelerates on the ground surface.

15. A method of determining effectiveness of an aircraft braking system on an aircraft during an aircraft landing comprising:
collecting braking data from an aircraft that has landed on a ground surface;
calculating a plurality of actual segment deceleration values (ASD) from the collected braking data for each of an associated plurality of segments of deceleration of the aircraft during a predefined braking event;

calculating a plurality of forecast segment deceleration values (FSD) for each of said associated plurality of segments of deceleration of the aircraft;

comparing each of the ASD with each of the FSD to generate at least one scalar deceleration value when the predefined braking event occurs that corresponds to effectiveness of a braking system associated with an aircraft landing operation during occurrence of the predefined braking event on an aircraft; and disseminating the at least one generated scalar deceleration value to downstream users, said downstream users located off the aircraft.

16. The method of claim 15, wherein comparing each of the ASD with each of the FSD comprises:

dividing each of the ASD by each of the FSD for each of the plurality of associated segments of deceleration of the aircraft to determine a plurality of segment digital deceleration values (SDDV).

17. The method of claim 16, further comprising:

defining each of the SDDV as one of a plurality of associated scalar deceleration values;

mapping each of the SDDV to form a landing performance graphic; and disseminating each of the SDDV and the landing performance graphic to the downstream users when a threshold speed of the aircraft is reached.

18. The method of claim 16, further comprising:

summing the plurality of SDDV;

dividing the sum of the plurality of SDDV by a total number of SDDV to obtain a digital deceleration value (DDV), wherein the DDV defines the scalar deceleration value; and disseminating the DDV to the downstream users when a threshold speed of the aircraft is reached.

19. A system for determining effectiveness of an aircraft braking system on an aircraft during an aircraft landing comprising:

a data collection module adapted to collect data relating to braking data associated with each of an associated plurality of segments of deceleration of the aircraft during a predefined braking event comprising said aircraft landing from each of a plurality of sensors, a Global Positioning System (GPS), an aircraft braking system, and an aircraft control system;

a calculation module in signal communication with the data collection module, the calculation module adapted to generate a scalar deceleration value based on data obtained from the data collection module when the predefined braking event occurs, said scalar value corresponds to effectiveness of a braking system associated with the aircraft landing operation during occurrence of the predefined braking event; and a communication module in signal communication with the calculation module and with at least one downstream user of the system located off said aircraft, said communication module adapted to communicate the scalar deceleration value calculated by the calculation module to said at least one downstream user of the system, said downstream users located off the aircraft.

20. The system of claim 19, wherein the calculation module calculates a plurality of values including a plurality of actual segment deceleration values (ASD) determined from the collected braking data for each of an associated plurality of segments of deceleration of the aircraft during the predefined braking event, and a plurality of forecast segment deceleration values (FSD) for each of the associated plurality of segments of deceleration of the aircraft, the calculation module compares each of the ASD with each of the FSD to generate the at least one scalar deceleration value when the predefined braking event occurs that corresponds to effectiveness of a braking system associated with the aircraft landing operation during occurrence of the predefined braking event on an aircraft.

* * * * *